United States Patent Office.

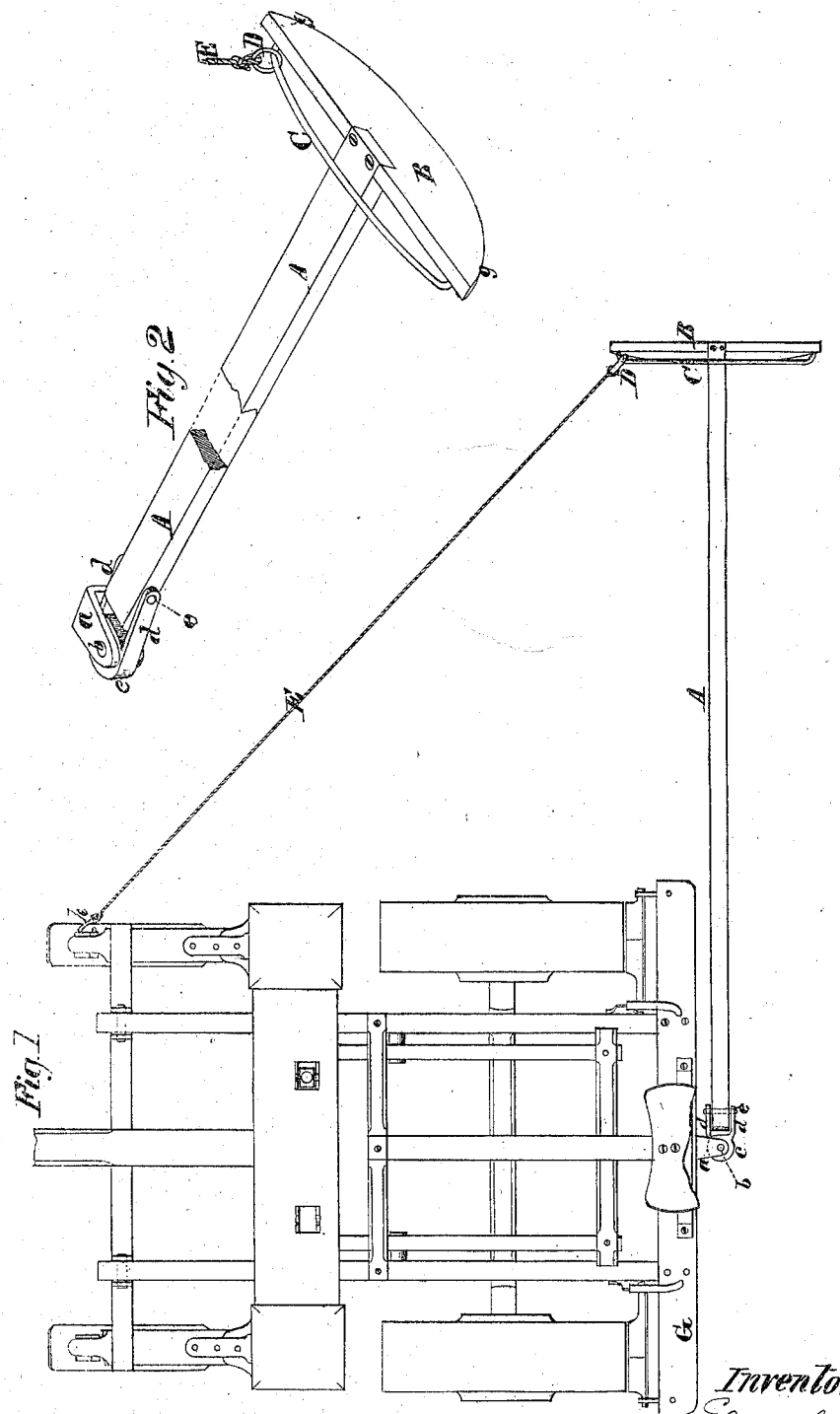

GEORGE ARMSTRONG, OF ELMIRA, ILLINOIS.

Letters Patent No. 95,067, dated September 21, 1869.

IMPROVEMENT IN MARKERS FOR SEEDING-MACHINES.

The Schedule referred to in these Letters Patent and making part of the same.

*To all whom it may concern:*

Be it known that I, GEORGE ARMSTRONG, of Elmira, in the county of Stark, and State of Illinois, have invented a new and improved Marker for Seeding-Machines; and I do hereby declare that the following is a full, clear, and exact description thereof, reference being had to the accompanying drawings, making part of this specification, in which—

Figure 1 is a plan view of a seed-planter having my improved marker applied to it.

Figure 2 is a perspective view of the marker with a portion of its pole broken away.

Similar letters of reference indicate corresponding parts in the several figures.

This invention relates to a new and improved marker, which is designed for running over the unplanted land during the operation of distributing seed by machinery, and marking the land, so that, by following the marks thus made, the seed will be planted in parallel rows, which are at equal distance apart.

The nature of my invention consists in providing a marker-pole or staff with a compound pivot-joint, for connecting it to a planter, and allowing either a vertical or lateral-swinging movement to be given to the marker; also, in providing said pole or staff with a marking-runner, which is turned up at both ends, and which has a traveller-ring and guide-rail, or the equivalent thereof, applied to it, in such manner that the said runner can be drawn by either of its ends, as will be hereinafter explained.

To enable others skilled in the art to understand my invention, I will describe its construction and operation.

In the accompanying drawings, fig. 1, I have represented my improved marker applied to the rear transverse bar G of the frame of a planter, for the purpose of showing the proper point of attachment to a planter.

A represents the pole of the marker, which should be equal in length to double the space between the drill-teeth, and which is attached to the rear bar of the planter, at the middle of the length of this bar, by means of a compound pivot-joint.

This attachment consists of an eye-piece, $c$, having jaws $d\ d$ formed on it, which eye-piece is connected by a vertical pivot-joint, $b$, to a fixed bearing, $a$, and by a horizontal transverse pivot-joint, $e$, to the pole A, as clearly shown in both figures of the drawings. This joint will allow the pole to be adjusted around from one side to the other of the machine at the ends of the rows, and will also allow the outer or free end of the pole to rise and descend freely, so as to accommodate itself to the inequalities of surface passed over.

To the outer or free end of the pole A, a marking-runner, B, is rigidly secured, at right angles to this pole, which runner has its bottom edge turned upward at both ends, as shown at $g\ g$, for the purpose of moving freely over the surface of the ground.

The pole A is secured to the upper edge of the runner, at the middle of the length of the latter, and at right angles thereto, thereby allowing the runner to be reversed end for end, by changing the pole from one side to the other of the machine.

While in operation, the pole A should be at right angles, or nearly so, to the line of draught, and the runner parallel, or nearly so, thereto, in which position the outer or free end of the pole is held by a rope, E, which is attached, by a hook, $h$, at some convenient point to the front part of the planter, and by a ring, D, to a rod, C, applied to the marking-runner.

The rod C is secured by its ends to the extremities of the runner B, on the inner side thereof, and this rod passes over the pole A, so as to allow the ring D to be slipped from one end to the other of the runner, whichever end may be foremost.

It is important to draw the marking-runner by its front end, and in order to prevent the draught of the rope E from tilting its forward end downward into the ground, I employ the traveller-ring D and rod C, which will allow the draught to be transferred from one end to the other of the runner at pleasure.

Instead of the ring and bar, a staple may be applied to the runner at or near each end, and the rope E attached to either one of these staples, by a hook on this rope.

It will be seen from the above description that I have a reversible marking-runner, which can be drawn by its front end, whether it be adjusted upon the right-hand or the left-hand side of the planter; also, that I have a marking-runner which will not clog or gather roots, sticks, or other obstructions, and which is rigidly attached to a pole that is pivoted to the planter by a compound joint.

Having described my invention,

What I claim as new, and desire to secure by Letters Patent, is—

1. A marker-pole, A, which is provided on one end with a compound pivot-joint, and on the opposite or free end with a marking-runner, substantially as described.

2. The rod C, applied to the reversible marking-runner B, and provided with a draught-ring, D, substantially as described.

3. The reversible or curved marking-runner B, so constructed and applied, as herein set forth, as to admit of its being drawn by either one of its ends.

GEORGE ARMSTRONG.

Witnesses:
DAVID J. WALKER,
JAS. D. HEATH.